United States Patent [19]

Yang

[11] Patent Number: 5,199,750
[45] Date of Patent: Apr. 6, 1993

[54] SNAKE TAIL RING SOCKET

[76] Inventor: Ming-Tung Yang, No. 4-3, Lane 97, Lung Chuan St., Taipei Hsien, Taiwan

[21] Appl. No.: 871,515

[22] Filed: Apr. 21, 1992

[51] Int. Cl.$^5$ ............................................. F16L 21/025
[52] U.S. Cl. ..................................... 285/231; 285/344; 285/345; 285/910
[58] Field of Search ................ 285/231, 344, 345, 910, 285/232; 277/208, 207 A

[56] References Cited

U.S. PATENT DOCUMENTS

| | | | |
|---|---|---|---|
| 3,510,140 | 5/1970 | Hermann | 277/207 A |
| 3,558,144 | 1/1971 | Corbett | 285/344 X |
| 3,567,233 | 3/1971 | Stepanich | 277/207 A X |
| 4,463,955 | 8/1984 | Delhaes | 285/345 X |

FOREIGN PATENT DOCUMENTS

| | | | |
|---|---|---|---|
| 226582 | 5/1959 | Australia | 285/344 |
| 806818 | 6/1951 | Fed. Rep. of Germany | 285/245 |
| 858163 | 12/1952 | Fed. Rep. of Germany | 285/344 |
| 1021216 | 12/1957 | Fed. Rep. of Germany | 285/344 |
| 1185874 | 1/1965 | Fed. Rep. of Germany | 285/344 |
| 2402022 | 9/1974 | Fed. Rep. of Germany | 285/231 |
| 847210 | 9/1960 | United Kingdom | 285/231 |

*Primary Examiner*—Dave W. Arola
*Assistant Examiner*—Heather Chun
*Attorney, Agent, or Firm*—Bacon & Thomas

[57] ABSTRACT

A seal ring socket is disclosed having a ball ring at an insert end which rolls up on a socket neck portion when an insertion pipe is pushed into the ring socket. The rolling of the ball ring expands its volume to insure a water-tight seal against the insertion pipe. Grooves formed in a socket neck portion cause unbalanced stressing of the interior and exterior surfaces of the ring socket thereby assisting in the rolling of the ball ring.

3 Claims, 6 Drawing Sheets

SNAKE TAIL RING SOCKET

BACKGROUND OF THE INVENTION

If we examine the connection operation among pipings in earlier times, such as bamboo pipes which were connected to a supply water, you would occasionally see water leakage and bad pipe connections which would cause water loss in large volume. The reason was simply that, because of the lack of modern materials and machines, the connection components were too simple to tightly seal and connect the pipes.

If we check the piping connections currently applied in the market, connection parts for plastic pipe and metal pipe, we would often discover the methods employed to connect such pipes were mainly focused on sealing oil, tapped threads, tape seal, etc., even though they were developed as a contemporary product having research background.

Should the fittings' connection or disassembly be conducted outside the factory for maintenance purposes, we must find an alternative material to seal the gaps between the connected pipes. Therefore, rubber gaskets, rings or conical ring sockets, etc., possessing elasticity were invented. These take advantage of their compressible properties to prevent the occurrences of fissures while connecting the pipes, as shown in FIGS. 1, 2 and 3. However, the sealing effect developed by these gaskets, rings or conical sockets depends on the compression force of pipe itself or the tightness of externally fastened bolts and nuts to achieve the compression sealing effect.

These type of rubber parts utilized for connecting pipes must be compressed and deformed to seal the fissures of the connected pipes. The reason why they can be deformed to seal the connected pipe is entirely dependent upon the fittings' compression force or the tightness of fastening bolts and nuts. In a passive state, no individual contribution can be made by these rubber parts. The aforementioned alternatives make it very difficult to reach an absolutely sealed state due to vibration or other factors which may cause loosening of the pipe fitting. They are the biggest weaknesses of the pipe connection operation.

SUMMARY OF THE INVENTION

The purpose of this invention is to overcome the weaknesses of the prior art devices and design a coupling ring socket. It is self-explanatory that the sectional area of one end of this ring is designed as a ball ring operating like a rolling ball. The end can curl to expand its peripheral volume during the pipe insertion operation. It can expand to compact the fissures and prevent leakage without compression or the use of bolts and nuts.

The secondary purpose of this invention is to use slots designed and located on an internal surface of the ring socket which will cause the internal and external surfaces to be stressed in an unbalanced fashion. Also, the curvature of the line between the ball ring and the tail end is designed to exceed the radius of the ball ring so that the line at the ball rings' cutting point can match the angle of the slots. The inside diameter of pass hole formed by ball ring is approximately equal to the inside diameter of an insertion pipe such that, as the insertion pipe moves forward, the wall thickness causes the ball ring to curl inward as a rolling snow ball. When the ball ring is stressed, the internal and external surfaces of ring sockets are unbalancedly stressed, i.e., ring socket itself will start to curl to increase its volume and achieve a sealing effect in the pipe connection.

The slots inside the socket will cause internal and external surfaces to be unbalancedly stressed. Also, the front end of the socket is designed as a ball ring, like a rolling ball. The curvature of a line of the cutting point is located at an internal edge of ball ring such that it will curl inward, like a rolling snow ball, and become bigger while the ball ring is being moved forward by the insertion pipe. It will completely fill the fissures between the insertion pipe and a connected fitting to prevent leakage.

DESCRIPTION OF THE PREFERRED EMBODIMENT

Figure 1:
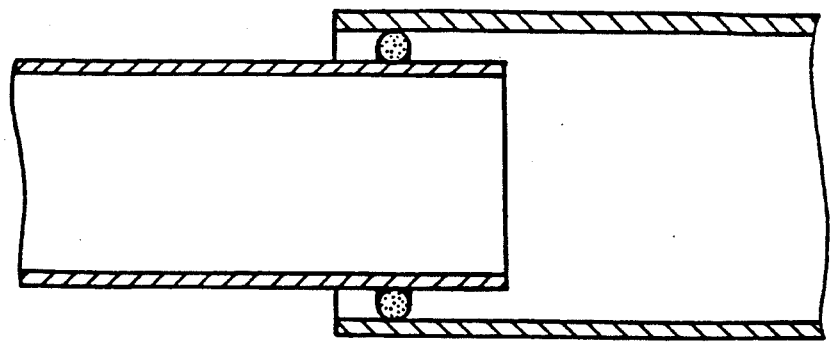
FIGS. 1, 2 and 3 are cross-sectional views of known sealing sockets for a fitting connection.
Figure 2:
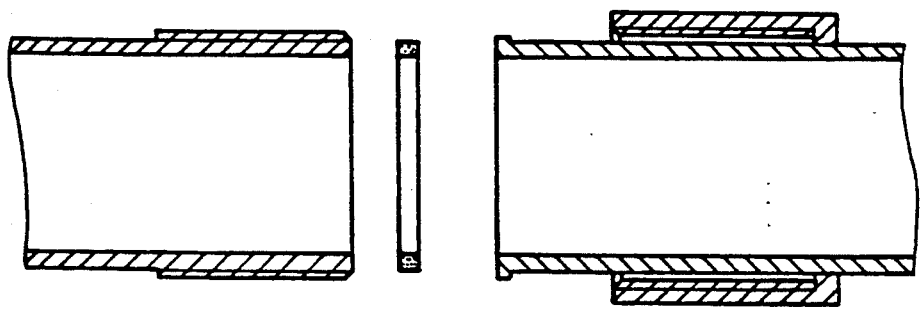
Figure 3:
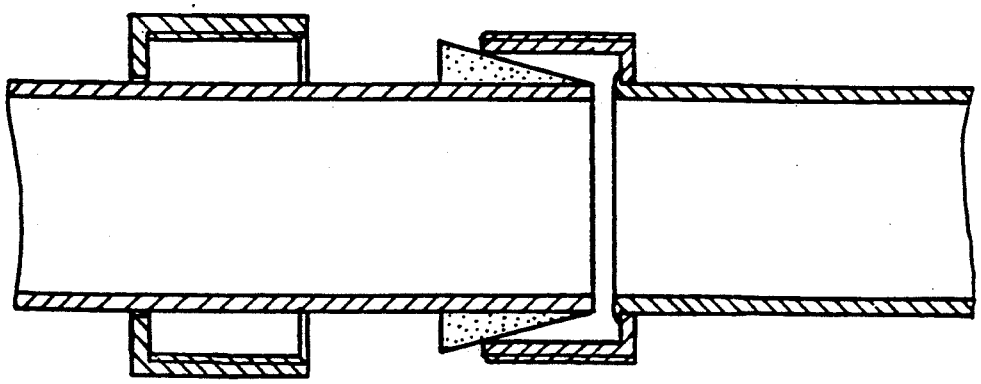
Figure 4:
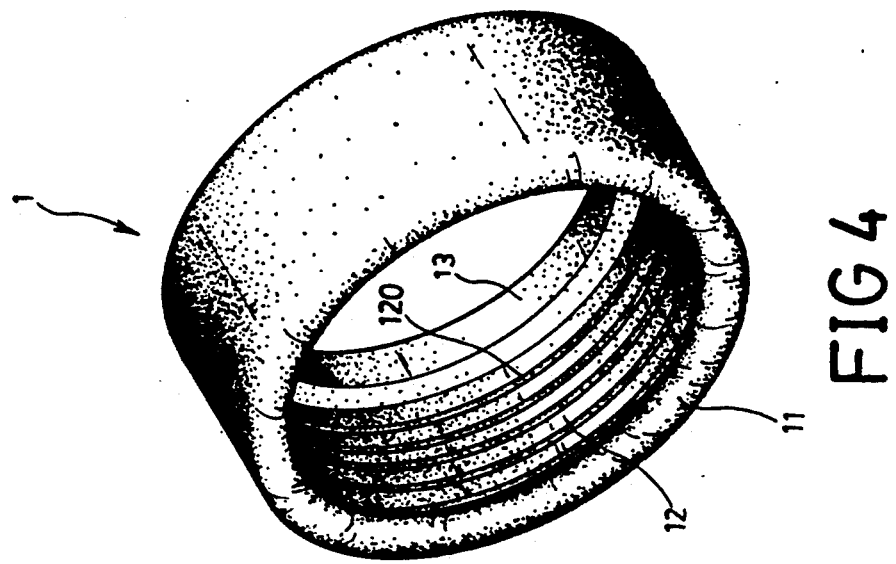
FIG. 4 is a perspective view of a ring socket according to this invention.
Figure 7:
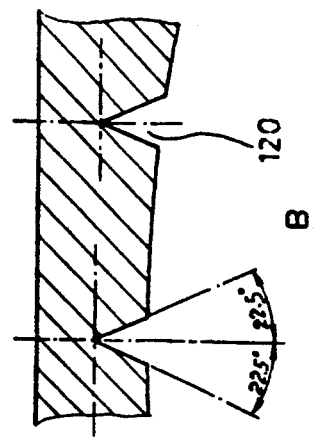
FIG. 7 is an enlarged, cross-sectional view of inset B of FIG. 5.
Figure 5:
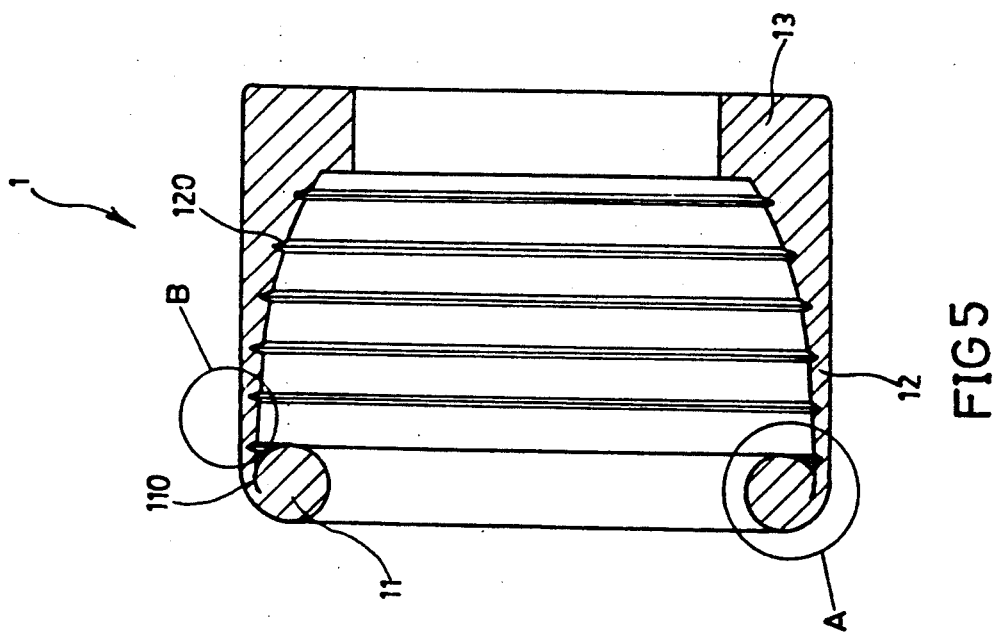
FIG. 5 is a cross-sectional view of the ring socket according to the invention.
Figure 6:
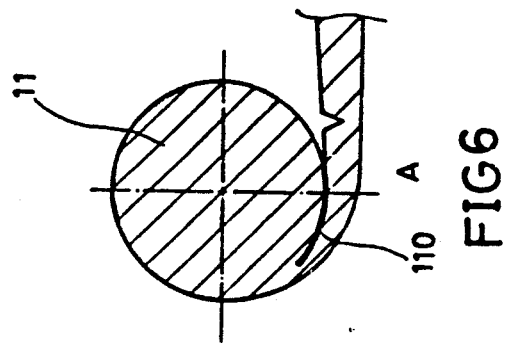
FIG. 6 is an enlarged cross-sectional view of inset A of FIG. 5.

FIGS. 4–7 are three dimensional and schematic sectional views of the present ring socket. From the Figures shown, it's self explanatory that the ring socket's (1) front end tip is structured as ball ring (11), just like a rolling ball, and the inside diameter of a pass hole formed by an internal edge of ball ring (11) is approximately equal to the inside diameter of an insertion pipe (2), i.e., the outside diameter of the insertion pipe (2) is slightly larger than the pass hole diameter of ball ring, a difference within 20%–25% diameter of the ball ring is preferred. It thus can comply with a spherical mechanics vector relationship and have ball ring (11) stressed at an optimized rolling angle so as to be smoothly pushed forward along the tube wall when the insertion pipe (2) is inserted. Also, an internal surface of ring socket (1), i.e., the internal surface of the socket neck, is peripherically machined to form sets of slots (120). The two inclined sides of the slots extend outwardly at an angle of 22.5° from a center line to form a 45° included angle opening inwardly to properly reduce the load stress on internal surface produced at socket neck (12). Furthermore, the depth of slots (120) is approximately equal to one half of the thinnest portion of socket neck (12). The stress load at the internal surface of ring neck is therefore, only about one half the stress load at an external surface; i.e. the internal and external surfaces are not uniformly stressed. Also, the curvature of line (110) of the cutting point connection between the ball ring (11) and front end of socket neck (12), is designed greater than the radius of ball ring (11) so as to let ball ring smoothly curl inward when being stressed from an external load. Again, it can match the unbalanced stresses created at socket neck's (12) internal and external surfaces. This makes ball ring (11) definitely curl inward, thereby enlarging its volume after insertion pipe (2) enters ring socket (1).

Figure 10:
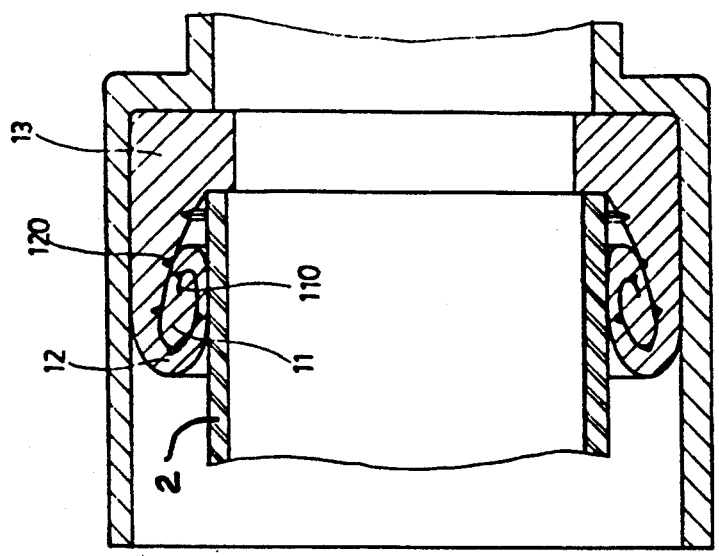
FIGS. 8, 9 and 10 are schematic cross-sectional views showing the curling action of the fitting according to this invention.
Figure 9:
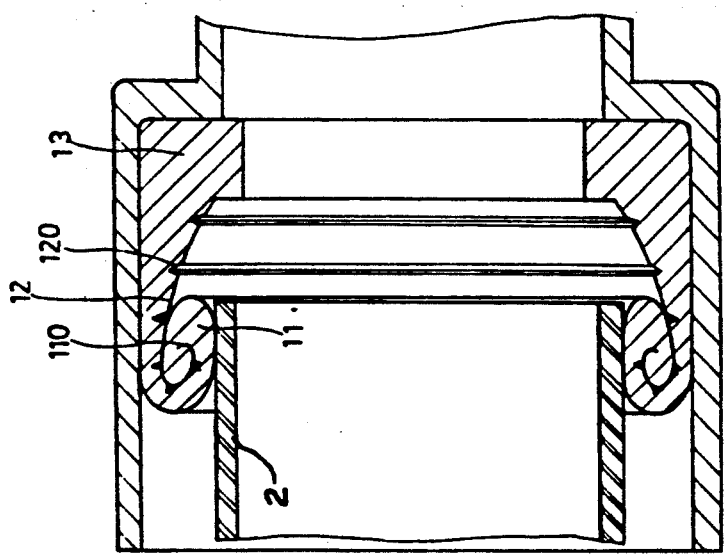
Figure 8:
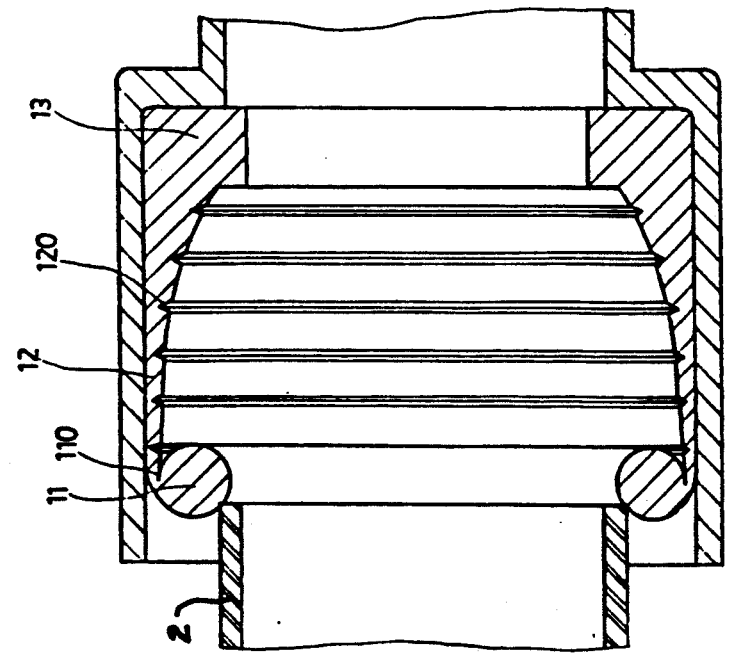
Figure 11:
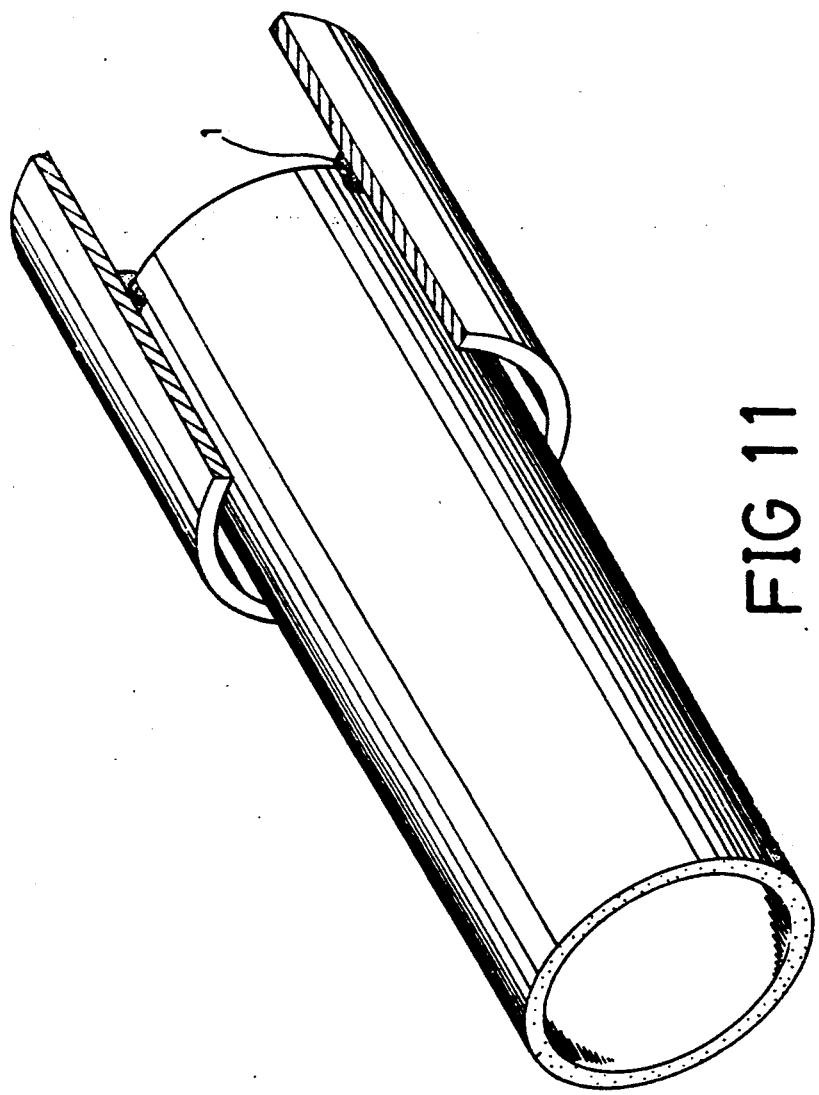
FIG. 11 is a perspective view of this invention applied to a first fitting connection.
Figure 12:
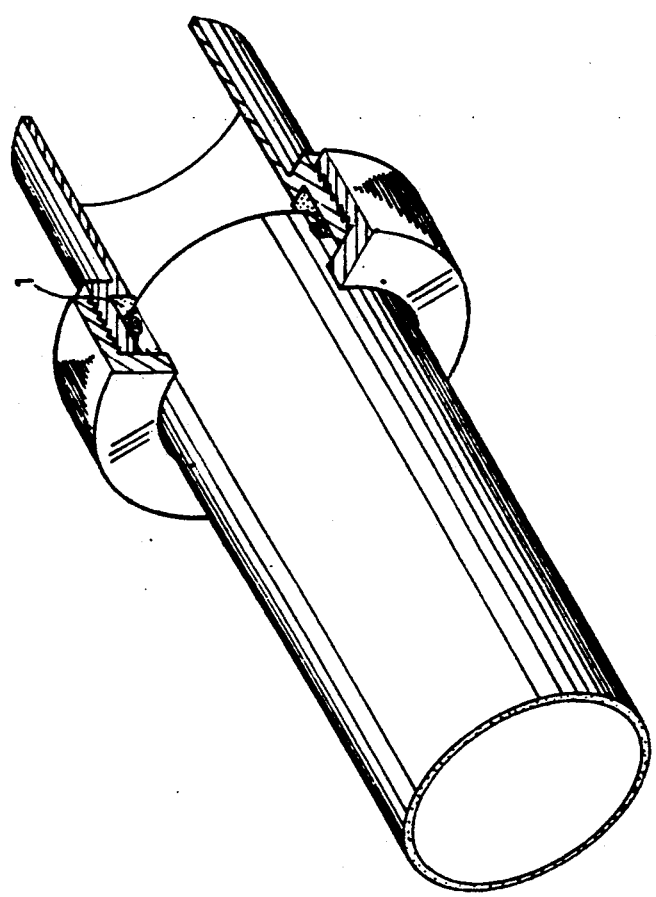
FIG. 12 is a perspective view of this invention applied to a second fitting connection.

If we refer to the assembly actions shown in FIGS. 8-10, it can be seen that the ball ring simultaneously and automatically starts its curling and enlarging its volume when insertion pipe (2) enters it. A further excellent sealing effect can be performed if it could be slightly fastened by a further compression or tapped thread.

If we check the socket head (13) located at the rear end of ring socket (1), in addition to the inside diameter matching with the fitting and the insertion pipe's (2) ID, an internal edge is preset with a bigger space to fit to insertion pipe's wall thickness. It won't block the smooth flow of the piping and, on the contrary, it reinforces the sealing of fitting assembly. The present invention avoids the old design using fitting compression and tapped threads, and can easily enlarge to cover the fissures and achieve a sealing effect. It can totally replace the commonly used ring socket's scope of application; it can also expand its applicable category, such as general insertion pipe fittings. A sealing effect is guaranteed by this invention.

I claim:

1. A seal ring socket for accommodating an insertion pipe in a fitting connection, the insertion pipe having an inside diameter, a wall thickness and an outside diameter, the seal ring socket sealingly positioned in said fitting connection and comprising: a front tip portion having a ball ring defining a pass hole having an inside diameter approximately equal to the inside diameter of the insertion pipe but smaller than the outside diameter of the insertion pipe such that insertion of the insertion pipe causes the ball ring to roll while the insertion pipe enters the seal ring socket, the difference between the outside diameter of the insertion pipe and the inside diameter of the pass hole is within 20%-25% of the diameter of ball ring; wherein a joint line where the ball ring is connected to a ring socket neck has a greater radius than the ball ring so as to facilitate the ball ring easy to rolling inward; and; a socket neck portion defining a plurality of slots in an internal surface inside the ring socket so as to cause unbalanced stressing of an internal and external surfaces of the ring socket such that the ball ring will curl inward to enlarge its volume to thereby sealingly engage the insertion pipe while being moved by the insertion pipe.

2. The seal ring socket according to claim 1 wherein the plurality of slots in the internal surface of the socket neck have inclined side edges extending at an oblique angle of 22.5° outwardly from a center plane so as to form an included 45° angle, their depth being equal to approximately one half of the thinnest portion of socket neck so as to make the stress at the external surface of the ring socket larger than the stress at the internal surface as the ball ring is rolled inwardly.

3. A seal ring socket sealingly positioned in said fitting connection and for accommodating an insertion pipe in said fitting connection, the insertion pipe having an inside diameter, a wall thickness and an outside diameter, the seal ring socket comprising: a front tip portion having a ball ring defining a pass hole having an inside diameter approximately equal to the inside diameter of the insertion pipe but smaller than the outside diameter of the insertion pipe such that insertion of the insertion pipe causes the ball ring to roll while the insertion pipe enters the seal ring socket, and; a socket neck portion defining a plurality of slots in an internal surface inside the ring socket so as to cause unbalanced stressing of internal and external surfaces of the ring socket such that the ball ring will curl inward to enlarge its volume to thereby sealingly engage the insertion pipe while being moved by the insertion pipe, wherein the plurality of slots in the internal surface of the socket neck have inclined side edges extending at an oblique angle of 22.5° outwardly from a center plane so as to form an included 45° angle, their depth being equal to approximately one half of the thinnest portion of socket neck so as to make the stress at the external surface of the ring socket larger than the stress at the internal surface as the ball ring is rolled inwardly.

* * * * *